UNITED STATES PATENT OFFICE.

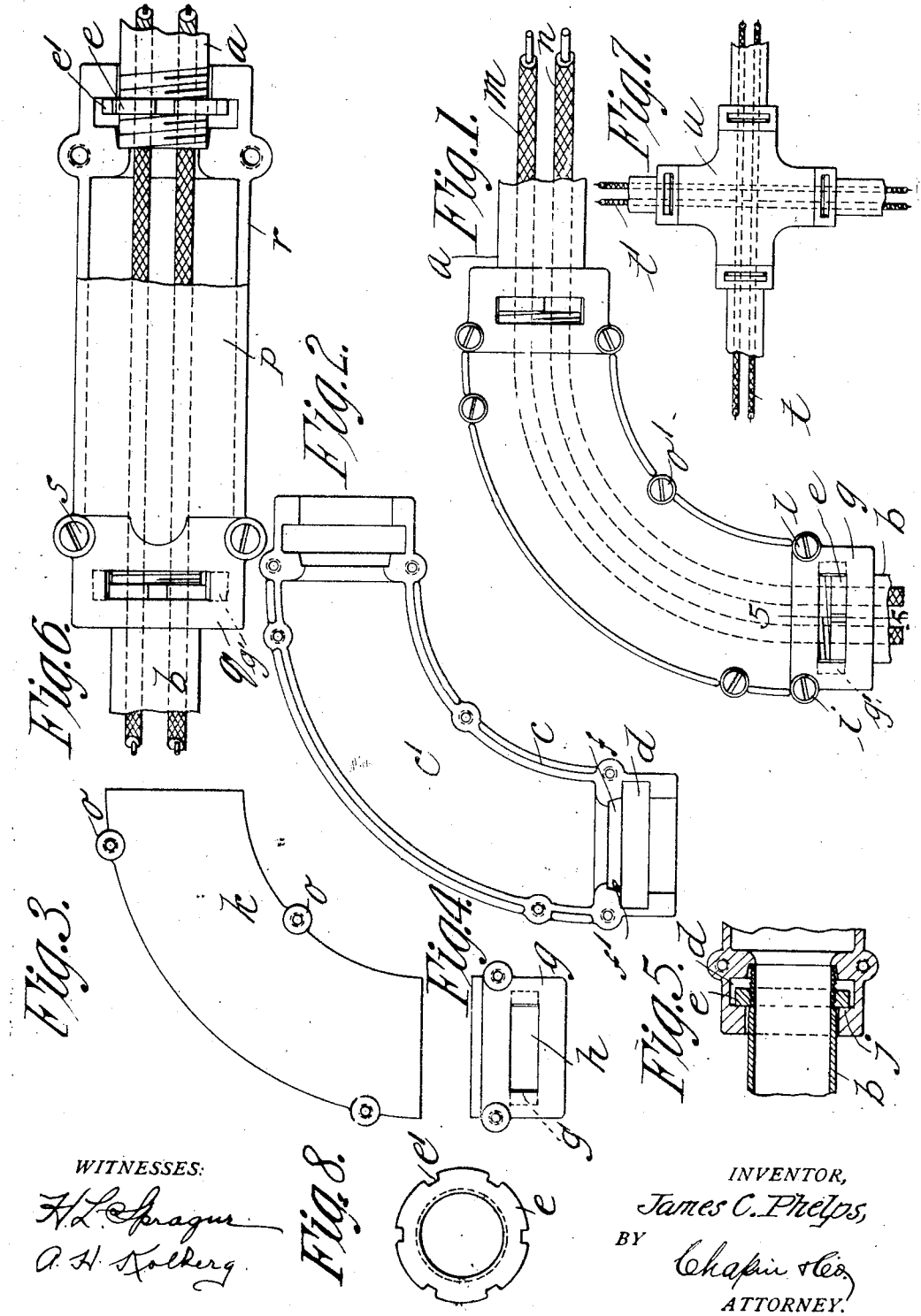

JAMES C. PHELPS, OF SPRINGFIELD, MASSACHUSETTS.

CONNECTOR FOR ELECTRIC CONDUITS.

1,083,756. Specification of Letters Patent. Patented Jan. 6, 1914.

Application filed October 23, 1912. Serial No. 727,320.

*To all whom it may concern:*

Be it known that I, JAMES C. PHELPS, a citizen of the United States of America, residing at Springfield, in the county of Hampden and State of Massachusetts, have invented new and useful Improvements in Connectors for Electric Conduits, of which the following is a specification.

This invention relates to improvements in connectors for electric conduits in which are located the cables that carry current as used for electric lighting or for power purposes.

In interior wiring the conduits are very often constructed with a large number of bends or curves which are interposed in their lengths thus making it very difficult to draw in or pull the cables through the conduits and especially around these corners or bends. Such a construction very often necessitates splicing the cables thus materially increasing the cost of installation.

The object of the present invention is to provide a connector or elbow member, one part of which is designed to be permanently attached to the opposed ends of the conduit pipes, and the cover, or other part being separable, whereby the workman can easily draw or pull the cables through the pipe after the cover has been removed. Such a construction avoids the necessity of cutting or splicing the wires, during such construction.

Referring to the drawings,—Figure 1 shows the connector attached to the adjacent ends of the conduit or pipe and with the cover secured in place. Fig. 2 is a view similar to Fig. 1, but with the cover removed, and clearly illustrating the interior construction of the connector, the connector being unattached to the conduits. Fig. 3 illustrates the cover detached from the connector. Fig. 4 is a view of one of the caps for securing the connector to the ends of the conduits. Fig. 5 is a vertical sectional view on the line 5—5 of Fig. 1 showing the manner for securing the connector to the end of the conduit. Fig. 6 is a plan view showing a straight connector member, that is to say, where it connects the ends of the conduit which extend in the same or axial direction. Fig. 7 shows the connector as applied to the double-T construction. Fig. 8 is a detailed plan view of the lock-nut.

Referring to the drawings in detail $a$ and $b$ designate the adjacent ends of the conduits or pipes that are to be connected together.

$c$ designates the part of the connector member that is designed to be permanently attached to the ends of the conduit. This member is formed with a groove $d$ to receive the nut $e$, shown in detail in Fig. 8, the opening therein being threaded and which is placed on the ends of the pipe. Adjacent the groove $d$ is a recess $f$, the side wall of which is slightly inclined, as indicated at $f^1$ and against this inclined wall the end of the adjacent pipe bears when rigidly secured to the member $c$. In order to secure this member to the pipe, the nut $e$ is placed in the groove $d$, then the cap $g$, shown in Fig. 4, is placed over the end of the pipe with its opening $h$ therein to receive the nut $e$. This cap is retained in place on the fixed member $c$ by means of the screws $i$. The operator then rotates the nut $e$ by inserting a screw driver, or other tool, in the notches or recesses $e^1$, the nut being turned onto the end of the pipe until it comes to rest against the shoulder $j$, whereby the end of the pipe is rigidly clamped to the member $c$. The same operation is carried out at the opposite end of the member $c$, so that this member is rigidly connected to the two ends $a$ and $b$ of the pipes.

$k$ designates a cover or cap that is adapted to be secured in place on the member $c$ after the wires, indicated at $m$ and $n$, are drawn through the conduits. The workman, after the cover $k$ is removed, as shown in Fig. 1, is allowed perfect freedom for pulling the cables through the pipes in either direction. After the cables have been drawn in or through one of the pipes, as $a$, the operator can then easily pull the cable through the adjacent pipe $b$, whereby the cables are easily drawn around a bend in the conduit. After this operation, the cap $k$ is secured in place. An important feature of this construction is that the interior surface $c^1$ of the member $c$ is made capacious to permit plenty of room to make splices, or take off branch wires, should occasion require. Another advantage of this construction is that the member $c$ is permanently connected to the two ends of the pipes $a$ and $b$, whereas in some of the connectors in present use there is no means of permanently attaching one part of this connector to the pipes. By making the recess $f$ with inclined shoulders $f^1$ the pipes are thoroughly grounded on this connector member, thus forming a good electrical contact for the entire circuit.

Referring to Fig. 6 in which the connector, instead of being made curving or quadrant shaped, is formed straight, the removable cover member being indicated at $p$, the right hand portion of which is shown broken away in the figure and with the cables extending directly through from one conduit to the other. The cap members $q$ are similar to that shown at $g$ in Fig. 4 which are employed at each end of the connector to permanently attach the member $r$ to the opposite ends of the pipe $a$ and $b$, it being, of course, understood that the cover $p$ is removed during the operation of pulling the cables through the pipes. The cover $p$ is removed by unscrewing the attaching bolt $s$, as already described in connection with Figs. 1 and 2. The usual nut construction, shown in Fig. 5, is employed to rigidly attach the opposite ends of the pipe $a$ and $b$ to the member $r$.

In Fig. 7 is illustrated the idea of making the conduit connector of cross or double-T shape, this form being especially useful where it is desired to connect or lead off branch wires from the main wires. As the wires $t$ may be considered the main circuit and $t^1$ the branch circuit, the splicing or connection being made within the box by simply removing the cover $u$ in the manner already described. From this construction it will be seen that the invention in general consists of a connector, one member of which is permanently attached to the opposite ends of the conduit pipes and with a cover adapted to be readily removed during the operation of drawing the cables in place or in making splices, if desired.

It should be noticed that the cap $g$ is formed with a grooved portion adjacent the edges of the opening $h$ to receive the nut $e$ when in place. This groove borders the opening $h$ on its opposite ends and is, of course, the same in shape and size as the groove $d$ in the ends of the fixed member $c$, and is indicated in Fig. 4 at $g^1$. The groove $d$ in the fixed member $c$ is not formed with an opening in the rear portion thereof since this portion of the connector is against the wall. The opening $h$ in the cap $g$ permits a screw driver or other implement to be inserted to turn the nut $e$.

What I claim, is:—

1. In a connector device for electric conduits to permit electric cables to be easily drawn through the same, and formed with recesses in its end portions to receive the opposed ends of the conduit, the inner end portions of the recesses being inclined and against which the ends of the pipes are designed to engage, grooves leading into the recesses and designed to receive a nut on the ends of the conduit, a cap, means for securing the cap to the connector device and having an opening therein to register with the said grooves and to receive said nut, a removable cover-member, and means for securing the same to the device and located between the caps.

2. A connector device for permanent attachment to the ends of the conduit pipes during the operation of drawing in the electric cables and comprising a fixed member and cap members, the ends of the members having a recess to receive the ends of the pipe on which is placed a nut, and registering grooves in the members to receive the nut, whereby when the cap is secured to the fixed member, the same may be secured to the pipes by means of the nut, a cover member, and means to secure the same in place after the cables are drawn through the conduits, as described.

3. A connector device for permanently securing together the ends of electric conduits and comprising a fixed member and cap members, the ends of the fixed member having a recess to receive the ends of the pipe, and a part of the recess being grooved to receive a nut on the ends of the pipe, said cap member having an opening and groove therein to register with the groove in the fixed member and to receive the nuts, means to secure the cap in place whereby the nut may be operated through said opening to secure the connector in place, as described.

JAMES C. PHELPS.

Witnesses:
K. I. CLEMONS,
HARRY W. BOWEN.